United States Patent [19]

Quinlan

[11] 4,275,191

[45] Jun. 23, 1981

[54] POLYMERIZATION OF AROMATIC NITROGEN HETEROCYCLIC COMPOUNDS

[75] Inventor: Patrick M. Quinlan, Webster Groves, Mo.

[73] Assignee: Petrolite Corporation, St. Louis, Mo.

[21] Appl. No.: 32,037

[22] Filed: Apr. 23, 1979

[51] Int. Cl.$^3$ .................... C08G 73/06; C07D 213/04; C07D 215/04; C07D 221/06
[52] U.S. Cl. .................................. 528/423; 546/255; 546/181; 546/102; 546/101; 260/45.8 NW
[58] Field of Search ............... 546/255, 181, 102, 101; 528/423; 260/45.8 NW

[56] References Cited

U.S. PATENT DOCUMENTS 2,807,910  10/1957  Erickson ............................... 546/255

*Primary Examiner*—Henry R. Jiles
*Assistant Examiner*—Robert C. Whittenbaugh
*Attorney, Agent, or Firm*—Sidney B. Ring; Hyman F. Glass

[57] ABSTRACT

This invention relates to polymerized aromatic nitrogen heterocyclic compounds as illustrated by compounds containing nitrogen heterocyclic rings and uses thereof.

Polymerization is effected by treating said aromatic nitrogen heterocyclic compounds at elevated temperatures and pressures with catalytic amounts of alkyl halides.

12 Claims, No Drawings

POLYMERIZATION OF AROMATIC NITROGEN HETEROCYCLIC COMPOUNDS

Although the polymerization of pyridines and quinolines in the absence of catalysts is thermodynamically prohibited, I have found that polymerization of pyridines and quinolines occur under the influence of catalytic amounts of alkyl halides at elevated temperatures and pressures capable of effecting such polymerization.

In practice, such polymerization occurs at temperatures ranging from 250°–400° C. In practice, I have found that reaction times of about 8 to 30 hours achieve good yields. Reaction times and pressures may vary widely, depending on the temperature and nature of the aromatic heterocycle.

In addition, molar ratios of aromatic nitrogen heterocyclics to alkyl halide necessary to bring about polymerization may vary widely such as from 4:1 to 1000:1 but preferably from 20:1 to 50:1. In practice, a sufficient amount of alkyl halide is employed to cause polymerization under the conditions employed.

Alkyl halides useful in catalyzing the polymerization include those of the general formula RX where R is a hydrocarbon, preferably alkyl, alkaryl, etc. and X is a halogen. Representative examples include $CH_3I$, $C_2H_5I$, $C_2H_5Br$, $C_2H_5Cl$, and $C_6H_5CH_2Cl$.

The infrared spectra of all polyquinolines obtained have two identical bonds in the 900–700 $cm^{-1}$ region, corresponding to the out-of-place deformations of the hydrogen atoms of the benzene ring. The bond at 830 $cm^{-1}$ is assigned to para-substituted benzene derivatives and the bond at 755 $cm^{-1}$ to ortho-disubstituted derivatives. The formation of para-disubstituted benzene rings in quinoline polymers may be attributable to rearrangement during polymerization. The IR spectra of the quinoline polymers show the disappearance of the bonds at 740, 810, 1030, 1100, 1570, 1590 and 1620 $cm^{-1}$ characteristics of the quinoline structure while a new intense bond occurs at 1600 $cm^{-1}$ which can be attributable to the valency vibrations of conjugated bonds in the chain.

It is found that the spectra of the pyridine polymers were marked by the disappearance of several bands in the region of 3070–3020 $cm^{-1}$ related to the valency vibrations of CH in the pyridine ring and the bands in the region of 1480, 1570, 1590 $cm^{-1}$ related to the C≡C and C≡N bonds of the hetero-ring and also bands at 700–750 $cm^{-1}$ characteristic of CH deformation vibrations of the pyridine ring. A new broad band appears at 1600–1610 $cm^{-1}$ characteristic of polymers with a system of conjugated multiple bonds.

In view of the IR data it appears that the reaction involves the opening of the hetero-ring (for pyridines as well as for quinolines) and the formation of a linear conjugated chain. The following is a probable structure for the polymerized aromatic heterocycles.

POLYPYRIDINES

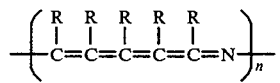

where R=H, alkyl, cycloalkyl, aryl, halogen n=1–100 but preferably 1–10.

POLYQUINOLINES

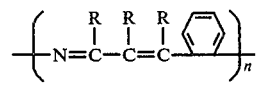

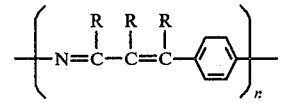

where R=H, alkyl n=1–100 but preferably 1–10

The polymerization is carried out in a pressure vessel and it is noted that the color of the reaction products varied from brown to black. The polymeric reaction products are hard brittle amorphous solids. The polymers are partially soluble in ether, benzene, acetone and chloroform, insoluble in water and hexane and soluble in formic, sulfuric and hydrochloric acids. They are also soluble in formamide and dimethyl formamide. The solubility in acids is not surprising in view of the ability of systems with a conjugated system of double bonds to form stable carbonium ions in acids and the presence of a tertiary nitrogen atom in the chain makes it possible to form salts in an acidic medium.

Aromatic nitrogen heterocyclic compounds capable of being polymerized by the use of high temperatures and catalytic amounts of alkyl halides include nitrogen heterocyclics such as quinoline, acridine, benzoquinoline, 2-methyl quinoline, pyridine, 2-methyl pyridine, 4-methyl pyridine, 2-butyl pyridine and the like.

To illustrate the preparation of the poly-aromatic heterocycles of this invention, the following examples are given.

EXAMPLE 1

Quinoline (pure) was dried over KOH pellets and distilled in vacuo. The fraction with a b.p. of 112°–113° C./14 mm was retained. The $CH_3I$(AR grade) was dried with anhydrous calcium chloride and distilled. The fraction with a b.p. of 42° C. was retained.

129 g. (1.0 mol) of quinoline and 5.7 g. (0.04 mol) of methyl iodide were placed in a small pressure reaction vessel and heated in a bath to 290° C.±2°. It was held there for 8 hours. A change in color from red to dark brown to black of the reaction mass was noted during the heating period. An increase in viscosity was also noted. The isolated product was a black, brittle, amorphous solid.

Anal. Theoretical, %, C, 83.72; N, 10.85; H, 5.42; Found, %, C, 82.74; N, 10.62; H, 5.20

It had an average molecular weight, as determined by an osmometer in dimethylformamide, of 850. From its IR spectra, the product was presumed to have the following structures.

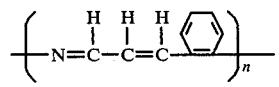

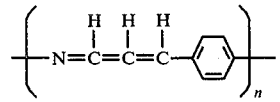

EXAMPLE 2

Pyridine (pure) was dried over barium oxide and distilled in a current of $N_2$ over KOH pellets. A fraction was collected with a b.p. of 115° C. The methyl iodide (AR grade) was dried with anhydrous calcium chloride and distilled. The fraction with a b.p. of 42° C. was retained.

Pyridine, 79 g. (1.0 mol) and methyl iodide, 7.1 g. (0.05 mol) were placed in a small pressure reaction vessel and heated in a bath, at 350°±3°, for 24 hours. The recovered product was a dark brittle solid.

Anal. Theoretical %, C, 75.9; H, 6.3; N, 17.7 Found %, C, 74.8; H, 5.8; N, 17.0

It had an average molecular weight, as determined by an osmometer in dimethylformamide, of 500.

The product, from its IR spectra, was presumed to have the following structure:

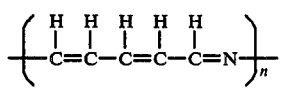

The following examples which further illustrate this invention are presented in tabular form.

TABLE 1

| Ex. | Aromatic Heterocycle (mol) | Catalyst (mol) | Temperature °C. | Time hr. | Probable Structures |
|---|---|---|---|---|---|
| 3 | Quinoline (1.0) | $C_2H_5I$ (0.05) | 270 | 20 | See Example 1 |
| 4 | Quinoline (1.0) | $C_2H_5Br$ (0.05) | 320 | 8 | See Example 1 |
| 5 | Pyridine (1.0) | $C_2H_5I$ (0.025) | 350 | 20 | See Example 2 |
| 6 | Pyridine (1.0) | $C_6H_5CH_2Cl$ (0.04) | 375 | 30 | See Example 2 |
| 7 | 2-methyl pyridine (1.0) | $CH_3I$ (0.02) | 360 | 30 | ${\left(\begin{matrix}H&H&H&H&CH_3\\|&|&|&|&|\\-C=C-C=C-C=N\end{matrix}\right)}_n$ |
| 8 | 4-methyl pyridine (1.0) | $C_2H_5I$ (0.04) | 350 | 30 | ${\left(\begin{matrix}H&H&CH_3&H\\|&|&|&|\\-C=C-C=C-C=N\end{matrix}\right)}_n$ |
| 9 | 2-methyl quinoline (1.0) | $CH_3I$ (0.02) | 320 | 24 | ${\left(-N=C(CH_3)-C(H)-C(H)-\text{phenyl}-\right)}_n$ and ${\left(-N=C(CH_3)-C(H)-C(H)-\text{phenyl}-\right)}_n$ |
| 10 | 2-butyl pyridine (1.0) | $CH_3I$ (0.05) | 350 | 36 | ${\left(\begin{matrix}H&H&H&H&C_4H_9\\|&|&|&|&|\\-C=C-C=C-C=N\end{matrix}\right)}_n$ |

USES

This invention also relates to the inhibition of corrosion, particularly the corrosion of metals in contact with the acid solutions.

The present invention is especially useful in the acidizing or treating of earth formations and wells traversed by a bore hole. It may also be used in metal cleaning and pickling baths which generally comprise aqueous solutions of inorganic acids such as sulfuric acid, hydrochloric acid, phosphoric acid and are useful in the cleaning and treatment of iron, zinc, ferrous alloys, and the like.

If no corrosion inhibitor is present when the aqueous acidic solution comes in contact with the metal, excessive metal loss and consumption or loss of acid, and other adverse results will be experienced. There has been a continuing search for corrosion inhibitors which can be used effectively in small concentrations, and which are economical to produce. The need is also for corrosion inhibitors which are effective at high temperatures, e.g., 200° F. and above, such as are found in operations involving acidic solutions, particularly oilwell acidizing where higher and higher temperatures are found as the well extends further into the earth.

While the compounds of this invention are of themselves particularly good acid corrosion inhibitors, optionally they may be blended with acetylenic alcohols, dispersing and solubilizing agents such as ethoxylated phenols, alcohols, and fatty acids. They may also be blended with such known acid inhibitors as the quinoline or alkyl pyridine quaternary compounds or synergists such as terpene alcohols, formamide, formic acid, alkyl amine, alkylene polyamines, heterocyclic amines, and the like.

Quaternary ammonium compounds may be illustrated by C-alkyl pyridine-N-methyl chloride quaternary, C-alkyl pyridine-N-benzyl chloride quaternary, quinoline-N-benzyl chloride quaternary, isoquinoline-N-benzyl chloride quaternary, thioalkyl pyridine quaternaries, thioquinoline quaternaries, benzoquinoline quaternaries, thiobenzoquinoline quaternaries, imidazole quaternaries, pyrimidine quaternaries, carbazole quaternaries, the corresponding ammonium compounds, pyridines and quinolines may also be used alone or in combination with the quaternary compounds. Thus a pyridine plus quinoline quaternary, a quinoline plus quinoline quaternary, or quinoline or amine alone or in combination may be used.

The formic acid compound may be selected from the esters and amides of formic acid. The formic acid compound may be from the group consisting of formate esters of the structure:

HCOOR where R is a monoaryl group, an alkyl group having 1 to 6 carbon atoms, cyclo-alkyl residues having 5 to 6 carbon atoms, alkenyl and alkynyl groups having 2 to 6 carbon atoms which may contain functional groupings selected from —C—OH, —OH, =C=O, —COOH, —SH, and $NH_2$. Examples of the formic acid compound are: methyl formate, ethylformate, benzyl formate, other alkyl and aryl formates, and the like. Other examples include formamide, dimethyl formamide, formanilide, and the like. Mixtures of the above amides may be used.

CORROSION TEST PROCEDURE

In these tests the acid solutions were mixed by diluting concentrated hydrochloric acid with water to the desired concentrations.

Corrosion coupons of 1020 steel (AISI) were pickled in an uninhibited 10% HCl solution for 10 minutes, neutralized in a 10% solution of $NaHCO_3$, dipped in acetone to remove water and allowed to dry. They were then weighed to the nearest milligram and stored in a desicator.

In most of the tests, a 25 cc/in$^2$ acid volume to coupon surface area ratio was used. After the desired amount of acid was poured into glass bottles, the inhibitor was added. The inhibited acid solution was then placed in a water bath which had been set at a predetermined temperature and allowed to preheat for 20 minutes. After which time, the coupons were placed in the preheated inhibited acid solutions. The coupons were left in the acid solutions for the specified test time, then removed, neutralized, recleaned, rinsed, dipped in acetone, allowed to dry, then reweighed.

The loss in weight in grams was multiplied times a calculated factor to convert the loss in weight to lbs./ft$^2$/24 hrs. The factor was calculated as follows:

$$\frac{\frac{144 \text{ in}^2}{\text{ft}^2}}{\frac{454 \text{ g}}{\text{lb}} \times \text{Surface Area of Coupon (in}^2) \times \frac{1 \text{ day}}{24 \text{ hrs.}}} = \text{Factor}$$

The results of these tests are included below:

TABLE 2

| Composition | Conc. in p.p.m. | Test Temp. °F. | Test Time Hrs. | Acid | Corrosion Rate (lbs/ft$^2$/day) |
|---|---|---|---|---|---|
| Ex. 1 | 2000 | 120 | 4 | 15% HCl | 0.072 |
| Ex. 2 | 2000 | 120 | 4 | 15% HCl | 0.083 |
| Ex. 7 | 2000 | 120 | 4 | 15% HCl | 0.080 |
| Ex. 9 | 2000 | 120 | 4 | 15% HCl | 0.068 |
| Ex. 10 | 2000 | 120 | 4 | 15% HCl | 0.057 |
| Blank | — | 120 | 4 | 15% HCl | 1.243 |

I claim:

1. A process of polymerizing aromatic nitrogen heterocyclic compounds selected from the group consisting of quinoline, acridine, benzoquinoline, 2-methyl quinoline, pyridine, 2-methyl pyridine, 4-methyl pyridine and 2-butyl pyridine which comprises heating said compounds with alkyl halides at temperatures of from about 250° C. to about 400° C. in a pressure reaction vessel for about 8 to 30 hours.

2. The process of claim 1 where the aromatic nitrogen heterocyclic compounds polymerized are pyridine, quinoline and alkyl substituted derivatives thereof.

3. The reaction products of claim 1.

4. The reaction products of claim 3.

5. The process of claim 2 where the aromatic nitrogen heterocyclic compound polymerized is quinoline.

6. The process of claim 2 where the aromatic nitrogen heterocyclic compound polymerized is pyridine.

7. The process of claim 2 where the aromatic nitrogen heterocyclic compound polymerized is 2-methyl quinoline.

8. The process of claim 2 where the aromatic nitrogen heterocyclic compound polymerized is 2-methyl pyridine.

9. The reaction product of claim 5.

10. The reaction product of claim 6.

11. The reaction product of claim 7.

12. The reaction product of claim 8.

* * * * *